Feb. 28, 1939.  A. P. DAVIS ET AL  2,148,731

SPEED CONTROL SYSTEM

Filed March 18, 1937   2 Sheets—Sheet 1

Fig. 1.

INVENTORS
Arthur P. Davis
and George Agins
BY
ATTORNEYS

Feb. 28, 1939. A. P. DAVIS ET AL 2,148,731
SPEED CONTROL SYSTEM
Filed March 18, 1937 2 Sheets-Sheet 2

INVENTORS
Arthur P. Davis
and George Agins
BY
Boquet, Henry & Campbell
ATTORNEYS Patented Feb. 28, 1939

2,148,731

UNITED STATES PATENT OFFICE 2,148,731

SPEED CONTROL SYSTEM

Arthur P. Davis, New York, and George Agins, Brooklyn, N. Y., assignors to Arma Engineering Co., Inc., Brooklyn, N. Y., a corporation of New York Application March 18, 1937, Serial No. 131,568

3 Claims. (Cl. 171—222)

This invention relates to control systems and has particular reference to controls for electric motors.

In accordance with this invention, a control system for electric motors, either direct or alternating current, is provided, by means of which the motor may be started, smoothly accelerated and kept running at a constant predetermined set speed, which speed, however, can be quickly changed and accurately controlled to any value within the limits of the equipment. The direction of rotation of the motor may be selected at will upon starting and can be quickly reversed at any time. Also, the motor can be quickly stopped.

The invention comprises essentially a sensitive switching device having reversing contacts connected in the power supply of the motor to be controlled, and constantly regulated jointly by a manually adjusted force and the force applied by the motor after starting. The manually adjusted force, adjusted in accordance with calibrated speed values, opposes the force applied by the motor until a balance is reached which is determined by the degree of the manual force, preselected in accordance with the speed desired for the motor. Any variation from this balance results in operation of the switch to provide the power conditions necessary to restore such balance. With this arrangement, any change in the manually-adjusted force results in an immediate change in the operation of the motor until the aforementioned balance is restored under the adjusted conditions, thus permitting a change in speed for the motor from one constant rate to another, as well as rapid reversal of the motor by reversing the contacts of the switch.

For a more complete understanding of the invention, reference may be had to the accompanying drawings, in which:

Figure 1 is a schematic diagram of the control system of this invention applied to a three-phase wound rotor type motor to be controlled;

Figure 2:
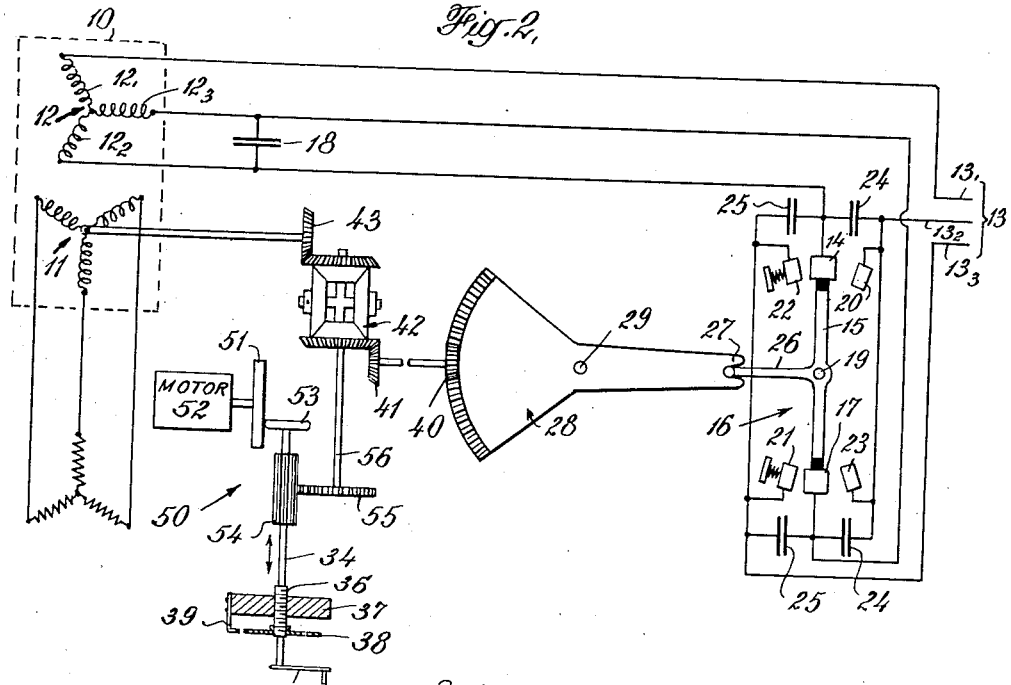
Fig. 2 illustrates schematically a modification of the arrangement of Fig. 1.

Referring to Fig. 1 of the drawings, numeral 10 designates the motor to be controlled, which is here shown as an induction motor of the wound rotor type, the rotor being designated 11 and the stator 12. One winding $12_1$ of the stator 12 is connected to one phase $13_1$ of the three-phase service line 13. Another winding $12_2$ of the stator 12 is connected to contact 14 of the moving contactor 15 of a form of reversing switch 16. The third winding $12_3$ of stator 12 is connected to the other contact 17 of the moving contactor 15. A split phase condenser 18 is connected across stator windings $12_2$ and $12_3$.

The moving contactor 15 of the switch 16 is pivoted at 19 for oscillating movement between the two sets of fixed contacts. The opposite contacts 14 and 17 of the contactor 15 are insulated from the contactor and from each other. Moving contact 14 may engage fixed contact 20 and moving contact 17 may engage fixed contact 21, when the contactor 15 is moved in a clockwise direction. When contactor 15 is moved in a counterclockwise direction, contact 14 may engage fixed contact 22 and contact 17 may engage fixed contact 23. Contacts 21 and 22 are preferably spring-mounted as shown, and a slightly smaller air gap is provided between contacts 14, 22 and 17, 21 than between contacts 14, 20 and 17, 23, for purposes to be described.

The various contacts of the switch 16 are connected between the remaining phases $13_2$ and $13_3$ of three-phase service line 13. Phase $13_2$ is directly connected to fixed contacts 20 and 23. The third phase $13_3$ is directly connected to the fixed contacts 21 and 22. Condensers 24 and 25 connected across cooperating contacts of the switch 16 are for suppression of arcing between them.

The moving contactor 15 of switch 16 is provided with a lateral arm 26, the end of which engages in a fork 27 on the end of a toothed sector 28 pivoted at 29. Secured to the sector 28 is a pin 30, to which are connected the inner ends of the two coil springs 31 and 32, the outer ends of which are connected to a suitable carriage 33 supported on the end of a rotatable shaft 34 in such a way that the shaft may rotate relatively to carriage 33. The other end of shaft 34 is provided with a crank 35 and with a screw 36 threaded through a fixed plate 37. A suitable dial 38 mounted on shaft 34 is calibrated for motor speed and cooperates with fixed pointer 39. It will be observed that rotation of the crank 35 causes up or down movement of frame 33, as seen in Fig. 1, and that this movement is imparted through springs 31 and 32 to the sector 28, which pivots about pin 29, operating the contactor 15 of switch 16.

A pinion 40 meshing with toothed sector 28 is connected by bevel gear 41 to one side of a mechanical differential 42. The other side of differential 42 is connected by gear 43 to the rotor 11 of controlled motor 10, which has suitable resistances 44 connected across its rotor windings to obtain high torque at all speeds. The shaft 45 of differential 42 is provided with a flywheel 46 and with an eddy current disc 47 rotating between the poles of two permanent magnets 48, providing a retarding torque proportional to speed.

In operation, and assuming that it is intended to have the motor 10 operate at a certain selected speed, crank 35 is rotated manually in a counterclockwise direction until the pointer 39 indicates the pre-selected speed on dial 38. This operation will move carriage 33 downwardly, as seen in Fig. 1, elongating spring 32 and allowing spring 31 to compress, so that sector 28 is rotated in a counter-clockwise direction about pin 29, imparting its movement to contactor 15, which is rotated in a clockwise direction to cause its contact 17 to engage stationary contact 21 before contact 14 engages contact 20, owing to the different spacing.

Engagement of contacts 17 and 21 results in the application of reduced torque voltage to stator 12 of motor 10, through the action of split phase condenser 18, so that the rotor 11 begins to turn. If the movement imparted to sector 28 results in further turning of contactor 15, the spring of engaged contact 21 compresses, allowing further movement of the contactor 15, so that contact 14 engages fixed contact 20, applying full voltage to all three phases of motor 10. As the rotor 11 of motor 10 turns, gear 43, which is connected to the rotor 11, rotates the upper and center gears of differential 42, connected shaft 45, flywheel 46 and disc 47.

The retarding torque, produced by the reaction of the disc 47 revolving in the magnetic fields of the magnets 48, is proportional to the speed of the disc 47. Motor 10 will accelerate until it reaches the predetermined speed, where the retarding torque acting on disc 47 becomes equal and opposed to the torque produced by the restoring force of springs 31 and 32. The center gears of the differential 42 accordingly roll around on the outer gears, and no movement is imparted to gear 41 or sector 28.

However, the motor 10 continues to accelerate until it is running slightly faster than the selected speed, whereupon the retarding torque acting on disc 47 will become greater than the restoring force of springs 31 and 32. The rate of rotation of the center gears of differential 20 is accordingly reduced, causing rotation of the lower gear thereof and of gear 41 and pinion 40, with the result that sector 28 is turned about its pivot 29 in a clockwise direction, i. e., opposite to its original movement by hand crank 35.

This movement of sector 28 results in separation of moving contact 14 from fixed contact 20, opening one of the lines to the motor 10 and restoring split phase operation thereof, which causes the motor to slow down and results in a decrease in the retarding torque acting on disc 47. The braking action on the differential by disc 47 is thus relieved, resulting in rotation of the sector 28 in a counterclockwise direction and reclosing of contacts 14 and 20, contacts 17 and 21 meanwhile remaining closed because of the close spacing between them and resilient support of the latter. The motor 10 again operates at full voltage and accelerates until it exceeds the preselected speed, whereupon the same sequence of operations is repeated. Thus, the motor speed at the preselected rate is accurately maintained within narrow limits.

Acceleration of the motor 10 is also governed by flywheel 46. Thus, when the motor starts, the inertia of flywheel 46 acts as a retarding force which is greater than the restoring force of springs 31 and 32 and acts through the differential 42 and switch 16 to cause the contacts of the latter to open and close intermittently, resulting in a change in the motor speed at a rate determined by the moment of inertia of the flywheel 46. Although the flywheel 46 has a comparatively small moment of inertia, its position, as shown in Fig. 1, renders it as effective as a flywheel of large moment of inertia mounted in the usual position directly on the shaft of motor 10.

For securing rotation of the motor 10 in the opposite direction, crank handle 35 may be turned from zero speed position to any speed position in a clockwise direction, resulting in the elongation of spring 31 and shortening of spring 32. Sector 28 then turns in a clockwise direction about pivot 29, and contactor 15 of switch 16 rotates in a counterclockwise direction, closing contacts 14, 22 and 17, 23, the former set closing first for initial split phase operation, because contact 22 is spaced nearer the contactor 15 than is contact 23. This reversal of switch 16 contacts reverses the phase sequence of the connection of service line 13 to the stator 12 windings and causes motor 10 to run in the opposite direction, the speed thereof being automatically regulated as before described.

Where it is desired to rapidly reverse the direction of rotation of the motor 10 from one selected speed to the same or another speed, the crank handle 35 is rapidly turned to indicate that speed on dial 38, and the springs 31 and 32 will thereby aid pinion 40 and sector 28 in reversing the position of contactor 15. Assuming that in these circumstances, contact 14, 20 and 17, 21 are closed, the former open first and the latter next, disconnecting motor 10 from the power line 13. However, contacts 14, 22 immediately close, followed by closing of contacts 17, 23, thus reversing the phase sequence to motor 10, which will brake the motor until it stops and this reverses its direction of rotation. It accelerates to a speed slightly higher than the preselected speed and at this point the aforementioned control maintains the motor at constant preselected speed in the manner described. This reverse-phase braking action will occur wherever the crank handle 35 is moved to a lower speed position, or moved through zero speed position, or moved to a reversed speed position, and is very effective to secure the desirable rapid change from one speed condition to another.

Figure 2 illustrates an alternative arrangement of the system of Fig. 1, and, in particular, a modified arrangement for operating the switch 16, in which the springs 31, 32 and the retarding torque device 47, 48 of the arrangement of Fig. 1 are replaced by a different manual regulator involving an infinitely variable speed change device 50. The preferred form of device 50 includes the friction disc 51, driven at constant speed by a small self-starting synchronous motor 52 and engaged by a friction wheel 53, which is adjustable radially thereon to secure various rates of rotation. Wheel 53 is fastened to gear 54, and by a suitable arrangement, they are free to turn as a unit on shaft 34 which is fitted with the screw 36 threaded through the fixed plate 37, and which has the crank handle 35 as before. Wheel 53 and disc 51 are so arranged that it is necessary to move the wheel 53 entirely across the diameter of disc 51, by means of handle 35, in order to change from the maximum speed position in one direction of rotation of motor 10 to the maximum speed position in the other direction.

Figure 3:
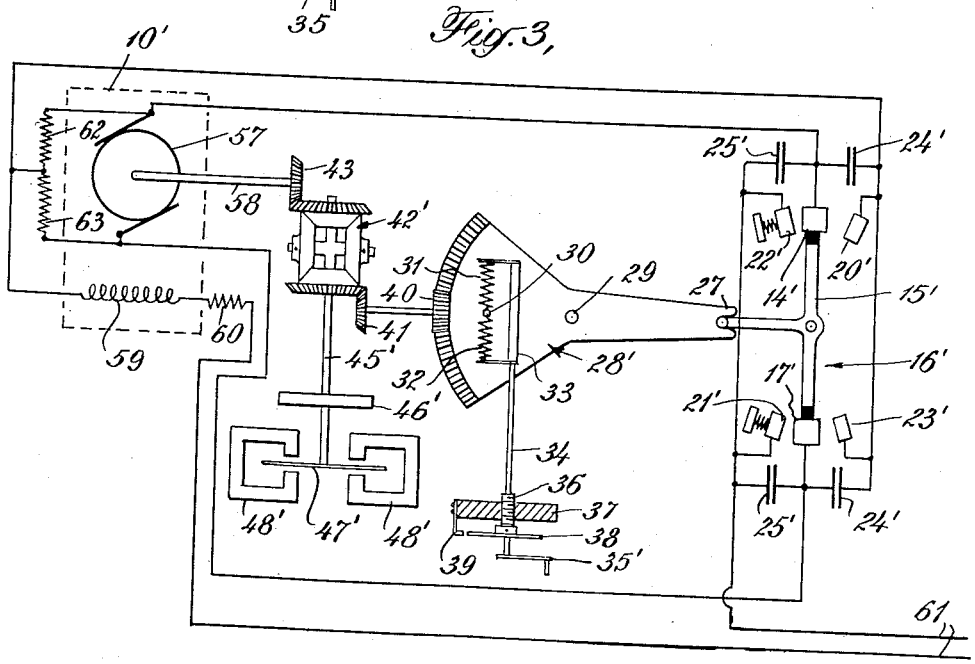
Fig. 3 illustrates schematically an arrangement of the system adapted to a direct current or series alternating current motor.

In operation of the modified arrangement of Fig. 2, self-starting synchronous motor 52 drives friction disc 51 at constant speed and wheel 53 is held against disc 51 by a constant pressure, rotating at a speed and in a direction determined by its distance from the center of the disc 51. For example, wheel 53 is stationary when it is at the center of disc 51, and will rotate increasingly faster as it is moved toward the outer edge of the disc 51. Also, wheel 53 will rotate in one direction when it is at one side of the center of the disc, and will rotate in the opposite direction when it is at the other side of the center. The movement of wheel 53 is transmitted through gears 54 and 55 and shaft 56 to the mechanical differential 42, and toothed sector 28 will be actuated through gears 40 and 41, due to the difference between the inputs to the mechanical differential. Movement of sector 28 actuates switch 16 and the speed of the drive motor will then be controlled in the manner previously described in connection with the arrangement of Fig. 1.

Where it is desired to control a direct current or series alternating current motor according to the system of this invention, the arrangement of Fig. 3 is employed. The armature 57, of the controlled motor 10', such as a direct current motor, is connected by shaft 58 to the mechanical differential 42', the shaft 45' of which is either fitted with the flywheel 46' and retarding torque device 47', 48' of the arrangement of Fig. 1, as illustrated, or is connected to the variable speed device 50 of the arrangement of Fig. 2. The motor 10' may have a series field winding 59 and the external series resistor 60 connected to one side of supply line 61. Equal resistors 62 and 63 are connected across the armature 57, the mid-tap between them being connected to the series field 59 and to the fixed contact 20' of the switch 16'. Fixed contacts 20' and 23' are connected together, as are fixed contacts 22' and 21', the latter being connected to line 61. Moving contacts 14' and 17' of contactor 15' are connected across the armature 57, and arc-suppressing condensers 24' and 25' are connected across the adjacent fixed and moving contacts of switch 16'.

In operation, in the arrangement of Fig. 3, the contacts first made when crank handle 35' is set, namely, 14', 22' or 17', 21', will cause either resistor 62 or 63 to be placed in series with the armature 57, and the other resistor to be placed in parallel with the said series combination of the first resistor and the armature. This provides low starting torque as the first step, followed by full current supply upon closure of contacts 17', 23' or contacts 14', 20'. Depending upon the automatic speed control afforded by movement of sector 28', switch 16' contacts are made and broken in the manner described, cutting resistances 62 and 63 in or out of the armature 57 circuit and thus controlling the speed of the motor 10'.

It will be seen that any required speed within the limits of the system illustrated in Figs. 1, 2 or 3 can be obtained by turning the handle 35 or 35' to the value as read on the corresponding pointer and dial 38, 39. This is so when the drive motor 10 or 10' is at rest or running at any speed in either direction. By means of the mechanical differential 42 the drive motor will reach and hold this speed. In the arrangement of Fig. 1, this is due to the relationship between the retarding torque of the disc 47 and the restoring force of the two springs 31, 32. The two forces will seek to be always equal and opposed to each other.

Although the speed of the drive motor may constantly change about a mean which is the preselected speed, the frequency of these changes will be sufficiently high to provide, in effect, a predetermined constant speed. For a given load, the speed and acceleration of the controlled motor are governed entirely by the frequency of the intermittent contact action of the sensitive reversing and switching device, and by the ratio of the time during which the contacts are made compared to the time during which the contacts are broken. With the drive motor running at any predetermined set speed, failure of the electric power service to the motor will cause it to slow down and come to rest. When the electric power service is restored, the system will automatically cause the drive motor to smoothly accelerate up to speed again, with no attention or manual resetting being needed. This system of speed control is especially desirable for obtaining low motor speeds.

While certain preferred embodiments of the invention have been illustrated and described herein, it is to be understood that the invention is not limited thereby, but is susceptible of changes in form and detail within the scope of the appended claims.

We claim:

1. In a control system for a reversible electric motor, the combination of a source of power for the motor, a reversing switch directly interposed between said source and the motor and having opposite fixed contacts and a movable contact interposed between them, means urging said movable contact in engagement with a fixed contact with a predetermined force, means controlled by said motor opposing said contact engagement force for disengaging said contacts, and means acting on said urging means for transferring the connection of said movable contact to said other fixed contact to reverse the motor, said fixed contacts providing the reversing connections to said source of power.

2. In a control system for an electric motor, the combination of a source of power for the motor, a reversing switch having normally engaged movable and fixed contacts, said switch being directly interposed between said source and the motor, means responsive to speed of said motor, operative connections between said means and said movable contact, whereby the engagement of said contacts is made and broken in accordance with the speed changes of the motor, and means for shifting the engagement of said movable contact with another fixed contact to reverse the motor.

3. In a control system for a polyphase motor, the combination of a source of power, a switch interposed between said motor and said source and having two sets of relatively movable cooperating contacts, direct connections between one set of contacts and certain phases of said source, direct connections between said other set of contacts and certain other phases of said source, means for urging said sets of contacts successively in engagement, and means actuated by the motor opposing said urging means for controlling the engagement and disengagement of said contact sets to regulate the speed of rotation of said motor.

ARTHUR P. DAVIS.
GEORGE AGINS.